US005773554A

United States Patent [19]

Dickerson et al.

[11] Patent Number: 5,773,554

[45] Date of Patent: Jun. 30, 1998

[54] COPOLYESTERS BASED ON 1,4-CYCLOHEXANEDIMETHANOL HAVING IMPROVED STABILITY

[75] Inventors: James Palmer Dickerson; Andrew Edwin Brink; Alan Joseph Oshinski; Kab Sik Seo, all of Kingsport, Tenn.

[73] Assignee: Eastman Chemical Company, Kingsport, Tenn.

[21] Appl. No.: 848,783

[22] Filed: May 1, 1997

Related U.S. Application Data

[62] Division of Ser. No. 670,949, Jun. 26, 1996, Pat. No. 5,656,715.

[51] Int. Cl.[6] .......... C08G 63/00

[52] U.S. Cl. .......... 528/271; 528/176; 528/193; 528/194; 528/272

[58] Field of Search .......... 528/176, 193, 528/194, 272, 271

[56] References Cited

U.S. PATENT DOCUMENTS

| | | | |
|---|---|---|---|
| 2,465,319 | 3/1949 | Whinfield et al. | 528/272 |
| 2,996,477 | 8/1961 | Long et al. | 528/272 |
| 3,047,539 | 7/1962 | Pengilly | 528/272 |
| 5,169,499 | 12/1992 | Eagles et al. | 428/175 |

OTHER PUBLICATIONS

Greogry and Watson, Polymer Engineering and Science, Nov., 1972, vol. 12, No. 6, "Kinetics of the Thermal Degradation of Poly (1,4–cyclohexylenedimethylene terephthalate)", pp. 3253–3263.

Extrusion of Film and Sheeting from Eastar Copolyester A150, Aug. 1995.

Wampler and Gregory, Journal of Applied Polymer Science, vol. 16, (1972) pp. 3253–3263.

*Primary Examiner*—Terressa Mosley
*Attorney, Agent, or Firm*—Betty J. Boshears; Harry J. Gwinnell

[57] ABSTRACT

This invention relates to a method of melt processing a copolyester having a moisture content of 0.02 weight % or more comprising:

(a) one or more dicarboxylic acids, and (b) a glycol component comprising from about 60 to 100 mole % 1,4-cyclohexanedimethanol.

6 Claims, No Drawings

COPOLYESTERS BASED ON 1,4-CYCLOHEXANEDIMETHANOL HAVING IMPROVED STABILITY

This is a divisional application of application Ser. No. 08/670,949, filed Jun. 26, 1996, U.S. Pat. No. 5,656,715.

FIELD OF THE INVENTION

The present invention relates to a method of melt processing a copolyester based on 1,4-cyclohexanedimethanol which involves the minimization or elimination of a drying step prior to melt processing of the copolyester.

BACKGROUND OF THE INVENTION

Polyesters such as poly(ethylene terephthalate) (PET) are widely used in the form of molded articles, bottles, containers, food trays, fibers, sheeting, and film. These PET polyesters are generally processed at high temperatures such as 500° F.–570° F. (260° C.–300° C.) and undergo severe hydrolytic degradation unless they are carefully dried prior to processing. Such drying operations are time consuming and expensive.

The effects of hydrolytic degradation in copolyesters such as these generally may be a loss in molecular weight, loss in inherent viscosity (I.V.), and/or lack of uniformity in products made therefrom, reduction in mechanical properties such as bubbles in extruded sheets, and the like.

U.S. Pat. No. 2,996,477 assigned to Eastman Kodak Company describes the use of 0.01 to 10.0 weight % N,N'-diphenyl-p-phenylenediamine or N,N'di-2-naphthyl-p-phenyldiamine in poly(cyclohexanedimethanol terephthalate) polyesters to provide improved thermal stability when molded parts are stored at elevated temperatures. This patent does not mention the minimization or elimination of drying the polyester prior to melt extrusion.

In the Journal of Applied Polymer Science, Vol. 16, pp. 3253–3263, 3257 (1972), entitled "Thermal and Hydrolytic Degradation of Poly(1,4-cyclohexanedimethylene terephthalate)", describes the thermal and hydrolytic degradation of PCT homopolyester at moisture levels of 0.012 weight %, 0.027 weight %, and 0.55 weight % at extrusion temperatures of 300° C., 310° C. and 320° C. with residence times of 3.5, 7.0 and 17.5 minutes. This article teaches that residence time, temperature, moisture content of the supply polymer, and their interaction all contribute significantly to the degradation of the polymer. It teaches specifically on page 3261 that "As shown for moisture levels above 0.027% in the supply polymer, the experimental values for I.V. breakdown are attributable to the moisture content of the supply polymer."

In Polymer Engineering and Science, November, Vol. 12, No. 6, (1972), entitled "Kinetics of the Thermal Degradation of Poly(1,4-cyclohexylenedimethylene terephthalate", Gregory and Watson teach the kinetics of thermal degradation of 1,4-cyclohexylenedimethylene terephthalate at 295°–330° C. in a small, prototype melt extruder. This article teaches drying of all materials for 8 hours at 110° C. under vacuum then purged for 16 hours at room temperature with a mixture of dry nitrogen and dry air to thoroughly dry the samples prior to processing.

U.S. Pat. No. 5,169,499 describes paper machine felts made from a copolymer comprising terephthalic acid, 1,4-methylolcyclohexane and isophthalic acid. There is no mention of thermal or hydrolytic stability of polyesters during melt processing. There is no mention of minimization or elimination of the drying step prior to melt processing.

SUMMARY OF THE INVENTION

This invention relates to a method of melt processing a copolyester having a moisture content of 0.02 weight % or more comprising (a) one or more dicarboxylic acids, and (b) a glycol component comprising from 60 to 100 mole % 1,4-cyclohexanedimethanol.

It is unexpected that this invention provides the advantages of minimization or elimination of the drying steps prior to the melt processing of the copolyester in combination with maintaining good thermal and hydrolytic stability during melt processing.

DESCRIPTION OF THE INVENTION

The copolyester useful in the method of the invention comprises dicarboxylic acids useful in the dicarboxylic acid component which include, but are not limited to aromatic dicarboxylic acids preferably having 4 to 40 carbon atoms, more preferably, 8 to 14 carbon atoms; aliphatic dicarboxylic acids having, preferably 4 to 40 carbon atoms, more preferably, 4 to 12 carbon atoms; or cycloaliphatic dicarboxylic acids having 4 to 40 carbon atoms, more preferably, 8 to 12 carbon atoms.

Particularly preferred examples of dicarboxylic acids useful in forming the copolyester of the invention include, but are not limited to, terephthalic acid, isophthalic acid, naphthalenedicarboxylic acid, cyclohexanedicarboxylic acid, 1,4-cyclohexanediacetic acid, diphenyl-4,4'-dicarboxylic acid, naphthalenedicarboxylate, succinic acid, glutaric acid, adipic acid, azelaic acid, sebacic acid, and the like.

Of these, terephthalic acid, isophthalic acid, naphthalenedicarboxylic acid, cyclohexanedicarboxylic acid and naphthalenedicarboxyate are preferred. More preferred acids are terephthalic acid, isophthalic acid and naphthalenedicarboxylic acid. Even more preferred acids are terephthalic acid and isophthalic acid, either used singly or in combination.

When cyclohexanedicarboxylic acid is used in the context of the invention, cis-, trans-, or cis/trans mixtures may be used. Any of the naphthalenedicarboxylic acid isomers or mixtures of isomers may be used. Some preferred naphthalenedicarboxylic acid isomers include 2,6-, 2,7- 1,4- and 1,5- isomers.

The acid component of the copolyester of the invention may contain from about 10 to about 100 mole % of these dicarboxylic acids. However, the copolyester of the invention preferably comprises one or more dicarboxylic acids comprising at least 50 mole %, preferably 60 mole to 100 mole %, more preferably 60 to 90 mole % terephthalic acid, based on the mole percentages of the acid component totalling 100 mole %. By terephthalic acid, suitable synthetic equivalents, such as dimethyl terephthalate, are included.

When isophthalic acid is present as the dicarboxylic acid, it is preferably present in the amount of 0.1 to 50 mole %, preferably 30 to 40 mole %, based the mole percentages of all acids in the acid component of the copolyester equalling 100 mole %.

It is also preferable when the acid component of the copolyester comprises naphthalenedicarboxylic acid, it is present in the amount of 0.1 to 50 mole %. When terephthalic acid and naphthalenedicarboxylic acid are both present in the copolyester, it is preferable the naphthalenedicarboxylic acid is present in the amount of 0.1 to 50 mole % and that terephthalic acid is present in the amount of 50 to 99.9 mole %.

Copolyesters may be prepared from one or more of the above dicarboxylic acids.

It should be understood that "dicarboxylic acids", includes the corresponding acid anhydrides, esters, and acid chlorides of these acids. In the acid component of this invention, the mole percentages of the acids referred to herein equal a total of 100 mole %.

In the glycol component of this invention, the mole percentages of the glycols referred to herein equal a total of 100 mole %.

In the invention, it is preferred that the glycol component of the copolyester of the invention contain from about 60 to 100 mole % of one of the isomers of 1,4-cyclohexanedimethanol.

Preferably, the copolyesters of this invention may be based on cis-, trans-, or cis/trans mixtures of 1,4-cyclohexanedimethanol. For example, 30/70, 50/50, and 70/30 cis/trans mixtures of the isomers may be readily used.

The glycol component may comprise up to 40, preferably up to 20 mole %, and more preferably, up to 10 mole %, of one or more other aliphatic or alicyclic glycols.

Such additional diols include cycloaliphatic diols preferably having 6 to 20 carbon atoms or aliphatic diols preferably having 2 to 20 carbon atoms. Examples of such diols are: ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, decalin diol and 2,2-bis-(4-hydroxypropoxyphenyl)-propane.

Copolyesters may be prepared from two or more of the above diols in addition to the 1,4-cyclohexanedimethanol.

When the copolyester contains ethylene glycol, it is preferable that the ethylene glycol be present in an amount less than 20 mole %, more preferably, less than 10 mole %.

Copolyesters containing substantially only 1,4-cyclohexanedimethanol and terephthalic acid or substantially only 1,4-cyclohexanedimethanol, isophthalic and terephthalic acid are preferred.

The copolyester resins useful in the blend of this invention are well known and are commercially available. Methods for their preparation are described, for example, in U.S. Pat. Nos. 2,465,319 and 3,047,539.

The polyesters of the invention preferably have an inherent viscosity of 0.1 to 1.5 dL/g, more preferably 0.1 to 1.2 dL/g, and even more preferably, 0.4 to 0.9 dL/g as determined in a 60/40 (wt./wt.) phenol/tetrachloroethane at a concentration of 0.5 g/100 ml as determined at 25° C.

It is preferred that the copolyester useful herein have a melting point of less than 265° C., more preferably less than 260° C., although melting points up to 310° C. are acceptable.

It is also preferable that the copolyesters of the invention have a moisture content of 0.02 to 1.0, preferably 0.02 to 0.4, more preferably 0.03 to 0.4, and more preferably, 0.2 to 0.3 weight percent of the total weight of the copolyester prior to melt processing.

The invention is meant to incorporate all melt processing methods known in the art.

The copolyesters similar to those of the invention are typically dried prior to melt processing. In this invention, it is preferable that the copolyester is dried by conventional methods for less than 2 hours at 60° C. to 100° C. It is more preferred that the copolyester, if dried, be dried using a desiccant bed with forced dehumidified air at 60° C. to 100° C.

However, the invention encompasses copolyesters which are dried by any means at any temperature for any time period prior to melt processing as long as the moisture content of the copolyester is as described herein as being useful in the context of this invention.

The term "minimal drying" is intended to encompass all of drying conditions described herein as being useful in the context of this invention. It is preferred in the process of the invention that the drying step commonly used prior to melt processing be eliminated.

As used herein, the term "melt processing" refers to any processing step commonly used in the art for polyesters or copolyesters which occurs after the polyesters or copolyesters are heated to their melting temperature or melting point. This includes, but is not limited to, injection molding, calendering, extrusion and rotational molding.

Moisture content may be measured by various methods known in the art. For the purposes of the following examples only, moisture content is measured by a Karl-Fischer Coulometric titration using a Mitsubishi Moisture Meter-Model CA-06 and the water vaporizer, Model VA-06.

Some drying conditions and moisture conditions are described in Eastman Chemical Company Publication TRS-50D entitled "Extrusion of Film and Sheeting from Eastar Copolyester A150" dated August, 1995. Specifically, this publication discloses that one should dry a copolyester containing terephthalic acid, isophthalic acid and 1,4-cyclohexanedimethanol prior to melt processing for 3 to 4 hours at 75° C. using a dehumidifier. It also discloses that moisture bubbles become visible in extruded sheet if the moisture content is excessively high.

It is also preferred within the context of this invention that the copolyester of the invention undergoes less than a 25% loss in weight average molecular weight, preferably less than 15% as determined by gel permeation chromatography when melt processed at crystalline melting temperature (Tm) at about 20° C. for 5 minutes.

The copolyesters useful in the invention may be combined with additives, branching agents, reinforcing agents, and the like either during polymerization or after polymerization to form a copolyester composition.

It is understood that other additives such as stabilizers, flame retardants, tougheners, epoxy compounds, mold release agents, nucleating agents, reinforcing agents such as glass fibers, fillers, antioxidants and colorants such as carbon black, might also be desirable in such formulations.

Such additives are generally present at 0.1 to about 40 weight %, preferably 0.1 to about 20 weight %, based on the total weight of the copolyester composition.

It is also understood that 0.1 to 5.0 mole %, preferably less than 2.0 mole %, mole % diacids of one or more branching agents is included within the context of this invention, including but not limited to, trimellitic acid, trimellitic anhydride, pyromellitic anhydride and the like.

Useful flame retardants, include, but are not limited to, brominated polystyrene combined with sodium antimonate.

Examples of reinforcing agents are glass fibers, carbon fibers, mica, clay, talc, wollastonite, and calcium carbonate. A particularly preferred reinforcing agent is glass fiber. It is preferable that the glass fibers be present in the polyester composition at from 0.1 to 45%, preferably 0.1 to 40%, by weight based on the total weight of said polyester composition.

Glass fibers suitable for use in the polyester compositions of the invention may be in the form of glass filaments, threads, fibers, or whiskers, etc., and may vary in length from about ⅛ inch to about 2 inches. Chopped glass strands having a length of about ⅛ inch to about ¼ inch are preferred. Such glass fibers are well known in the art. Of course, the size of these glass fibers may be greatly diminished depending on the blending means employed, even to lengths of 300 to 700 microns or lower.

The polyester compositions of the invention may be reinforced with a mixture of glass and other reinforcing agents as described above, such as mica or talc, and/or with other additives.

The components of the copolyester composition of the invention may blended and/or mixed by any suitable technology known in the art.

The copolyester of this invention may be melt processed and extruded, injection molded or compression molded into a variety of shapes and forms including fibers, molded parts, bottles, pellets, containers, sheeting, film and the like.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

The following abbreviations are used in the following examples:

Diacid Residues
T—terephthalic acid
I—isophthalic acid
G—1,4 dimethylcyclohexane dicarboxylate (95% trans isomer)
H—1,4 dimethylcyclohexane dicarboxylate (33% trans isomer)
N—2,6 naphthalene dicarboxylate
Diol Residues
EG—ethylene glycol
CHDM—1,4-cyclohexanedimethanol
B—butane diol Copolyester compositions are represented by mole % of residue in the following scheme:

mole % diacid1/mole % diacid2/mole % diacid3, etc. (mole % diol1/mole % diol2/etc.).

For example, a copolyester formed from a 50 mole % isophthalic acid, 50 mole % terephthalic acid together with ethylene glycol would be designated 50I/50T(100EG).

GPC—gel permeation chromatography
Mn—number average molecular weight
Mw—weight average molecular weight g/mole—gram(s)/mole
rpm—rotations per minute
psi—pounds per square inch
Tm—melting temperature

EXAMPLES

Example 1—Injection Molding

A pelletized copolymer created from 35 mole % isophthalic acid, 65 mole % terephthalic acid together with 1,4 cyclohexanedimethanol (CHDM) was prepared for injection molding into tensile and flexural specimens. The molding was done on a 200-ton Toyo-200G reciprocating screw injection molding press. The mold cavity was an 8-cavity family mold with 4 tensile specimens and 4 flexural specimens. The details of the experiment settings can be found in Table I-A. Dried pellets were dried in a desiccant bed drier at a −40° F. (−40° C.) dewpoint with an air flow rate of 1 $ft^3$/lb./min prior to injection molding. For comparison, a similar polyester resin comprised of 100 mole % terephthalic acid, 38 mole % ethylene glycol, and 62 mole % CHDM was molded under the same conditions. With only 38% substitution of another glycol in the copolyester composition, an increase from ~5% to ~12% loss in molecular weight occurred.

TABLE I-A

Experimental Conditions

| | | Process Condition |
|---|---|---|
| Mold Temp. | | 23° C. |
| Zone Temp 1 | | 271° C. |
| Zone Temp 2 | | 271° C. |
| Zone Temp 3 | | 271° C. |
| Zone Temp 4 | | 271° C. |
| Zone Temp 5 | | 271° C. |
| Nozzle Temp | | 282° C. |
| Screw Speed | % | 30 |
| Back Pressure | psi (Pa) | 5 ($3.4 \times 10^4$) |
| Injection Speed | % | 10 |
| Injection Pressure | psi (Pa) | 900 ($6.2 \times 10^6$) |
| Hold Pressure | psi (Pa) | 700 ($4.8 \times 10^6$) |
| Hold Time | sec | 15 |
| Cooling Time | sec | 20 |

Table I-B indicates the retention in molecular weight as determined by gel permeation chromatography in a 30/70 azeotrope of hexafluoroisopropanol/methylene chloride. Molecular weight determinations are not absolute, but are relative to (PET) poly(ethylene terephthalate) standards.

TABLE I-B

Tensile Specimens/Molecular Weight Retention after molding

| | | 65T/35I (100 CHDM) | | | 100T (62 CHDM/38 EG) | | |
|---|---|---|---|---|---|---|---|
| | | | | % Diff.* | | | % Diff.* |
| Drying Time | hrs. | 0 | 16 | | 0 | 16 | |
| % Moisture | % | 0.2 | 0.04 | | 0.21 | 0.04 | |
| Mn pellets | g/mole | 16,200 | 16,200 | | 18,700 | 18,700 | |
| Mw pellets | g/mole | 36,000 | 36,000 | | 45,700 | 45,700 | |
| Mn after molding | g/mole | 13,300 | 14,600 | 5.5% | 14,900 | 16,900 | 11.8% |
| Mw after molding | g/mole | 31,200 | 32,700 | 4.6% | 34,500 | 39,100 | 11.8% |
| % Mn Loss (from pellet) | % | 14.8% | 9.8% | | 20.3% | 9.6% | |
| % Mw Loss (from pellet) | % | 13.0% | 9.2% | | 24.5% | 14.4% | |

*% change in dried material versus undried material (relative to dried material)

Example 2—Melt Extrusion

Multiple Passes of material through a twin-screw extruder

A pelletized copolymer prepared from 35 mole % isophthalic acid, 65 mole % terephthalic acid together with 1,4-cyclohexanedimethanol (CHDM) was dried in a desiccant bed drier at a −40° F. (−40° C.) dewpoint with an air flow rate of 1 $ft^3$/lb./min prior to extrusion. The polymer was melt processed in a Werner-Pfleiderer ZDK-30 twin-screw corotating extruder, quenched in a water bath and re-pelletized. The screw-type in the extruder was an aggressive screw used for compounding glass into polyester materials. The extruder conditions are as listed in Table II-A. The recommended drying time for similar type polyesters (100T (62CHDM/38EG)) is 6 hours at a (−40° F.,−40° C.) dewpoint. The shortened drying conditions in these experiments were chosen to allow residual moisture to remain in the polyester pellets and to lower its molecular weight as measured by I.V. during processing.

In Pass #1, the pellets were dried for 2 hours prior to processing—a condition which would mimic conditions where the material was not dried properly prior to processing. With the low loss of I.V. in the first pass, a second pass (Pass #2) was taken immediately after Pass #1 where the pellets received no drying. Residual moisture remained on the pellets from the water bath quench. Also for Pass #2, extruder barrel temperatures were raised to 570° F. (300° C.) for Zones 3–9.

As indicated in Table II-B, a significant conservation of molecular weight (as determined by I.V.) is noted even with minimal or no drying prior to melt processing.

TABLE II-A

Extruder Process Conditions

| Setup Condition | Units | Pass #1 | Pass #2 |
|---|---|---|---|
| Drying at 70° C. | hours | 2 | 0 |
| Zone 1 Set | (°C.) | 265 | 265 |
| Zone 2 Set | (°C.) | 265 | 265 |
| Zone 3 Set | (°C.) | 280 | 300 |
| Zone 4 Set | (°C.) | 280 | 300 |
| Zone 5 Set | (°C.) | 280 | 300 |
| Zone 6 Set | (°C.) | 280 | 300 |
| Zone 7 Set | (°C.) | 280 | 300 |
| Zone 8 Set | (°C.) | 280 | 300 |
| Zone 9 Set | (°C.) | 280 | 300 |
| Screw RPM | rpms | 250 | 168 |
| Pellet Feed Rate | lb./hr. | 30–40 (14–18) | 30–40 (14–18) |
| Torque | % machine | 85 | 83 |
| Die Melt | (°C.) | 308 | 327 |
| Die Pressure | psi (MPa) | 190 (1.3) | 110 (7.6) |

To determine the loss in molecular weight for Passes #1 and #2, the I.V. of the original pellets was compared to the I.V. of the processed pellets. The loss in I.V. was determine by:

$$\% \, I.V._{loss} = \frac{I.V. \text{ initial} - I.V. \text{ final}}{I.V. \text{ initial}} \times 100\%$$

TABLE II-B

Pellet weight Retention after Extrusion

| | PASS #1 | PASS #2 | UNITS |
|---|---|---|---|
| Initial Pellet I.V. | 1.201 (0.75) | 1.185 (0.74) | $ft^3$/lb (dl/g) |
| Final Pellet I.V. | 1.185 (0.74) | 1.129 (0.705) | $ft^3$/lb (dl/g) |
| % IV loss | 1.3 | 4.7 | % |

This table shows very little I.V. loss even with little to no drying prior to melt processing of the copolyester.

Example 3—Rheological Testing—Melt Stability Determination by Capillary Rheometry In order to mimic the conditions in polymer processing, a heated capillary can be used. The advantage to this test is that the experimental conditions and temperatures can be better controlled than with processing equipment. For these experiments, a polymer sample was melted in the barrel of a capillary rheometer (Instron Capillary Rheometer model 3211) preheated to the test temperature. The melted resin was then extruded through a 0.027 in. (0.686 mm) diameter capillary die with a length of 1.337 in. (34.0 mm). Extrudates were collected at the various melting times and molecular weight was determined by gel permeation chromatography (GPC). The solvent used for GPC measurements is a 30/70 hexafluoroisopropanol/methylene chloride solution. The relative change in weight average molecular weight from the untreated original polymer at a certain time (typically 5 minutes) is reported as the melt stability in Tables III-A and III-B.

TABLE III-A

Weight Average Molecular Weight as determined by GPC (5 minutes at 590° F. (310° C.))

| EXAMPLE | POLYMER-DIACID (DIOL) | TEMP (°C.) | % Mw Loss WET* | DRY* | DIFF* |
|---|---|---|---|---|---|
| 1 | 100T (100 CHDM) | (310) | 40 | 25 | 15 |
| 2 | 95T/5I (100 CHDM) | (310) | 26 | 27 | −1 |
| 3 | 83T/17I (100 CHDM) | (310) | 38 | 27 | 11 |
| 4 | 65T/35I (100 CHDM) | (310) | 25 | 17 | 8 |
| 5 | 70T/30N (100 CHDM) | (310) | 32 | 15 | 17 |
| 6 | 70T/30H (100 CHDM) | (310) | 34 | 29 | 5 |
| 7 | 68T/32G (100 CHDM) | (310) | 37 | 22 | 15 |
| 8 | 100T (91 CHDM/9 EG) | (310) | 43 | 22 | 21 |
| 9 | 100T (62 CHDM/38 EG) | (310) | 69 | 25 | 44 |
| 10 | 100T (100 EG) | (310) | 70 | 31 | 39 |
| 11 | 100N (100 EG) | (310) | 60 | 38 | 22 |

WET* — refers to an equilibrium uptake of moisture by the pellets in ambient conditions, typically 0.2–0.3% by weight.
DRY* — refers to the pellets being dried for 10 hours at 70° C. under vacuum.
DIFF* — refers to the difference in % Mw loss of WET material and DRY material and is a measure of the hydrolytic degradation of the polymer assuming the dry material undergoes only thermal degradation.

Samples 9, 10 and 11, which contain higher levels of glycols other than CHDM show a marked decrease in molecular weight retention (Wet-vs-Dry) when compared to Samples 1–8.

Since the melting temperatures of the various copolyester compositions change, testing was also conducted at conditions which more closely match actual processing conditions. Temperatures were chosen which are ~20° C. higher than the crystalline melting temperature as determined by differential scanning calorimetry. Materials with high crystallization half-times, such as 65T/35I (100 CHDM) may require annealing to produce measurable levels of crystallization for Tm determination.

TABLE III-B

Weight Average Molecular Weight Loss as determined by GPC (5 minutes at Tm + ~20° C.)

| EXAMPLE | POLYMER-DIACID (DIOL) | TEMP (°C.) | % Mw Loss WET* | DRY* | DIFF* |
|---|---|---|---|---|---|
| 12 | 100T (100 CHDM) | (310) | 40 | 25 | 15 |
| 13 | 95T/5I (100 CHDM) | (310) | 26 | 27 | −1 |
| 14 | 83T/17I (100 CHDM) | (285) | 18 | 11 | 7 |
| 15 | 65T/35I (100 CHDM) | (250) | 10 | 1 | 9 |
| 16 | 70T/30N (100 CHDM) | (310) | 32 | 15 | 17 |
| 17 | 70T/30H (100 CHDM) | (260) | 11 | −4 | 15 |
| 18 | 68T/32G (100 CHDM) | (260) | 12 | 5 | 7 |
| 19 | 100T (91 CHDM/9 EG) | (295) | 33 | 10 | 23 |
| 20 | 100T (62 CHDM/38 EG) | (250) | 27 | 9 | 18 |
| 21 | 100T (100 EG) | (285) | 63 | 26 | 37 |
| 22 | 100N (100 EG) | (285) | 59 | 14 | 45 |

WET* — refers to an equilibrium uptake of moisture by the pellets in ambient conditions, typically 0.2–0.3% by weight.
DRY* — refers to the pellets being dried for 10 hours at 70° C. under vacuum.
DIFF* — refers to the difference in % Mw loss of WET material and DRY material and is a measure of the hydrolytic degradation of the polymer assuming the dry material undergoes only thermal degradation.

Examples 21 and 22 show approximately 60% loss in Mw when tested without drying. Example 14, which is also tested at 285° C. shows only an 18% loss in Mw.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A method of melt processing a copolyester having a moisture content of 0.02 weight % or more comprising:

(a) one or more dicarboxylic acids, and (b) a glycol component comprising from about 60 to 100 mole % 1,4-cyclohexanedimethanol, wherein said melt processing comprises injection molding, calendaring, extrusion of rotational molding.

2. The method of claim 1, wherein said moisture content is 0.03 weight % or more.

3. The method of claim 1, wherein said moisture content is from 0.02 to 1.0 weight %.

4. The method of claim 1, wherein the moisture content is from 0.02 to 0.4 weight %.

5. The method of claim 1, wherein the moisture content is from 0.03 to 0.4 weight %.

6. The method of claim 1, wherein the moisture content is from 0.2 to 0.3 weight %.

* * * * *